(No Model.)  2 Sheets—Sheet 1.
W. DUNCAN.
TROLLEY SUPPORT.
No. 500,263.  Patented June 27, 1893.
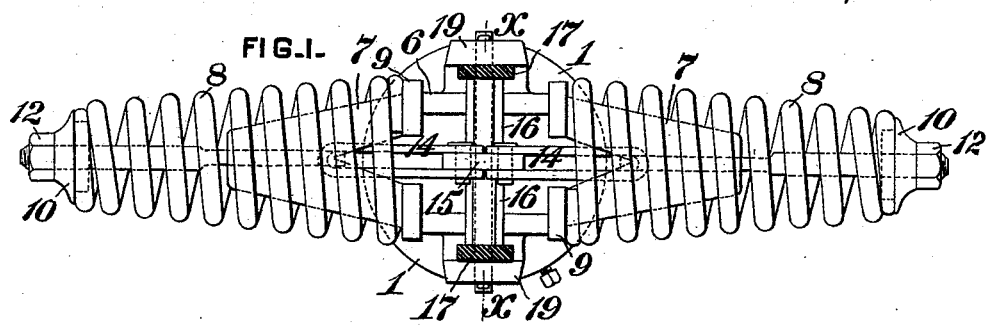
FIG. 1.
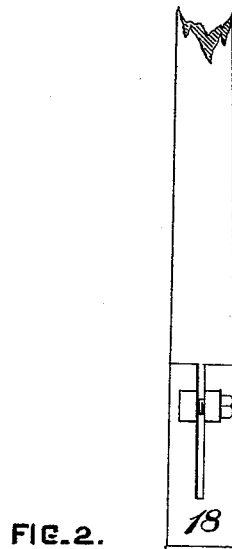
FIG. 2.
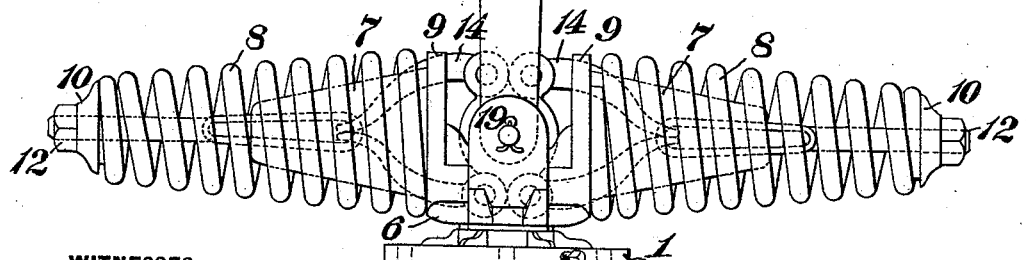
WITNESSES:  INVENTOR,
Dannis S. Wolcott  William Duncan,
T. E. Gaither  by George H. Christy
  Att'y.

(No Model.) 2 Sheets—Sheet 2.
W. DUNCAN.
TROLLEY SUPPORT.
No. 500,263. Patented June 27, 1893.
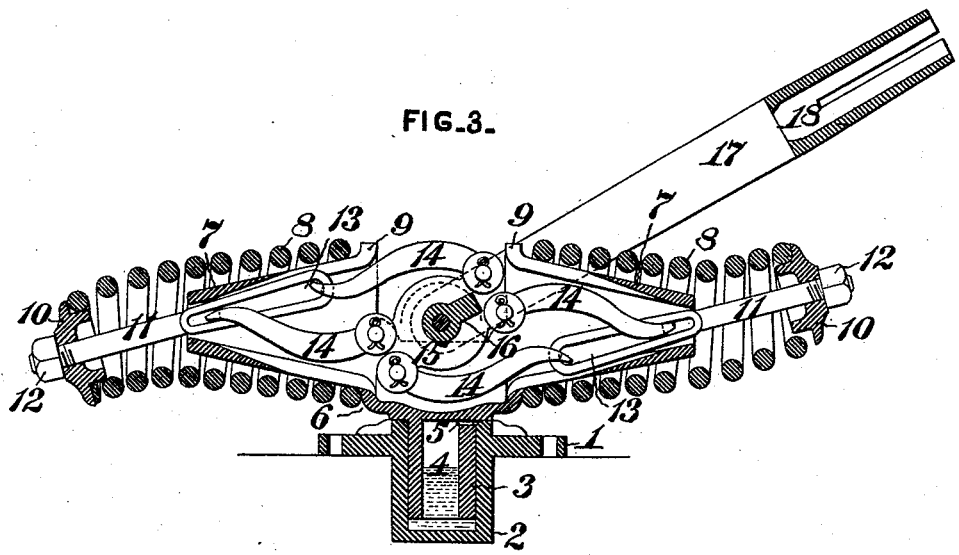
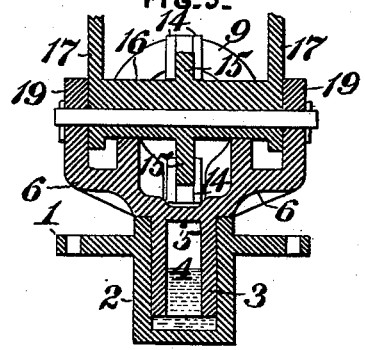
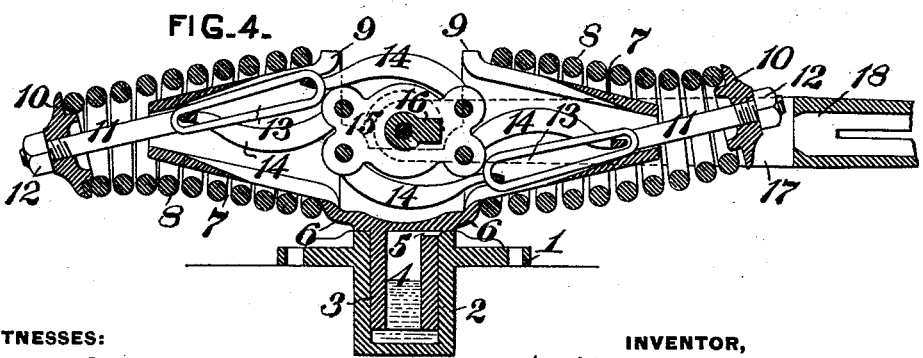
WITNESSES: INVENTOR,

UNITED STATES PATENT OFFICE.

WILLIAM DUNCAN, OF ALLEGHENY, PENNSYLVANIA.

TROLLEY-SUPPORT.

SPECIFICATION forming part of Letters Patent No. 500,263, dated June 27, 1893.

Application filed December 7, 1892. Serial No. 454,358. (No model.)

*To all whom it may concern:*

Be it known that I, WILLIAM DUNCAN, a citizen of the United States, residing at Allegheny, in the county of Allegheny and State of Pennsylvania, have invented or discovered certain new and useful Improvements in Trolley-Supports for Electric Cars, of which improvements the following is a specification.

The invention described herein relates to certain improvements in trolley supports for electric cars, and has for its object a construction wherein the connections from the pole to the springs are arranged within the springs and where the draft in the springs corresponds approximately to the axis of the springs. And it is a further object of said invention to provide for the utilization of both springs at the same time for supporting the pole without regard to the direction or angle to which the pole is swung.

In the accompanying drawings forming a part of this specification, Figure 1 is a top plan view of my improved support, the pole being removed. Fig. 2 is a side elevation of the same. Figs. 3 and 4 are sectional elevations, showing the positions of the several parts when the pole is swung to an angle of about forty-five degrees with the car roof, and parallel therewith respectively, and Fig. 5 is a transverse section on the line x,x, Fig. 1.

In the practice of my invention a supporting plate 1, adapted to be secured by bolts to the top of a car, is provided with a central socket 2 having its lower end closed. Within this socket is placed the pivot pin 3, which is formed with an axial opening 4 and is made a little shorter than the socket. The socket and hollow pin form a receptacle for oil for lubricating the bearing faces of the socket and pin. In order to allow the oil to enter the pin, when the latter is placed in the socket, a vent 5 is formed at or near the upper end of the opening in the pin as shown in Figs. 3, 4 and 5. The pin 3 is formed integral with the frame 6, provided with the hollow conical supports or guides 7, for the springs 8, which bear at their inner ends against the flanges 9 at the bases of the conical supports. On the outer ends of the springs are placed the bearing plates 10 through which pass the bolts 11 having nuts 12 on their outer ends, and having their inner ends longitudinally slotted as at 13. Each of these slotted bolts is connected by links 14, to a disk or arms 15 formed integral with the cross bar 16 connecting the lower ends of the arms 17 of the pole socket 18. The links are pivotally connected to the disk 15 on opposite sides of the cross-bar, which corresponds to the center of movement of the pole socket. By reference to Figs. 2, 3 and 4, it will be seen that the lower link on one side of the pole socket and the upper link on the opposite are arranged on a line passing through the center of movement of the pole, and the points of connection of the links with the pole socket are equidistant from the center of movement. As a consequence of this construction and arrangement, the use of a pivot pin for connecting the socket pole to the ears or lugs 19 of the frame 6 is not necessary, although it is preferred to use the pin to prevent the socket pole dropping out in case of breakage of any of its connections with the springs. When the pole is free to move it will be held in a vertical position as shown in Fig. 2, the springs being connected at four points to the pole, such points being equidistant from its center of movement. When the pole is shifted to an angular position one spring will be placed under tension by the inward movement of one of the upper links and the other spring is placed under tension by a corresponding movement of the lower link on the opposite side of the pole socket. It will be observed that the conical shape of the spring supports permits of the bolts being shifted so as to remain in line with the points of connection of the links to the pole socket, but also permits of a flexure of the springs corresponding to the change of position of the bolt. The connecting links are slightly curved as shown so that as the pole is turned down toward a horizontal position as shown in Fig. 4, the link will approach and bear upon the periphery of the disk 15, and so maintain an approximately constant line of pull, which will be tangential to the arc described by the points of connection of the links with the pole socket. As two of the diametrically arranged links are moved inwardly as described, the outer ends of the other links are moved outwardly along the slot in the bolts 11, as shown in Figs. 3 and 4.

It will be observed that the pivot point of the pole socket is in line or approximately in line with the axes of the springs and that the arms of the pole socket are a little longer than the distance from the center of movement of the pole to the outer ends of the springs, so that the pole can be turned to a horizontal position thereby permitting the car to pass under an object which will just clear the springs or their supports.

I claim herein as my invention—

1. In a trolley support for electric cars, the combination of a frame, springs arranged on opposite sides of the frame, a pole socket arranged between the springs and flexible connections from the outer ends of the springs passing through the springs and attached to the pole socket on opposite sides of its center of movement, substantially as set forth.

2. In a trolley support for electric cars, the combination of a frame, springs arranged on opposite sides of the frame, a pole socket having its center of movement in line or approximately so with the axes of the springs, and flexible connections from the outer ends of the springs passing through the latter and attached to the pole socket on opposite sides of its center of movement, substantially as set forth.

3. In a trolley support for electric cars, the combination of a frame provided with hollow conical spring supports, springs arranged on said supports, a pole socket arranged between the conical supports, and flexible connections from the outer ends of the springs and passing through the conical supports and attached to the pole socket on opposite sides of its center of movement, substantially as set forth.

4. In a trolley support for electric cars, the combination of a frame, springs arranged on opposite sides of the frame, a pole socket arranged between the springs, two flexible connections from each of the springs and attached to the pole socket on opposite sides of its center of movement, substantially as set forth.

5. In a trolley support for electric cars, the combination of a frame, springs arranged on opposite sides of the frame, a pole socket arranged between the springs, bolts connected to the outer ends of the springs and having their inner ends slotted, and two links extending from each of the slotted bolts and connected to the pole socket on opposite sides of its center of movement, substantially as set forth.

6. In a trolley support for electric cars, the combination of a pivotally mounted frame, provided with a hollow conical spring support, a spring arranged on said support, a pole socket pivotally mounted in line or approximately in line with the normal axis of the spring, and two flexible connections from the outer end of the spring and attached to the pole socket on opposite sides of its pivotal point, substantially as set forth.

In testimony whereof I have hereunto set my hand.

WILLIAM DUNCAN.

Witnesses:
DARWIN S. WOLCOTT,
WILLIAM McKENNAN, Jr.